US006783457B2

(12) United States Patent
Hughs-Baird et al.

(10) Patent No.: US 6,783,457 B2
(45) **Date of Patent: *Aug. 31, 2004**

(54) GAMING DEVICE HAVING AN INDICATOR SELECTION WITH PROBABILITY-BASED OUTCOME

(75) Inventors: Andrea C. Hughs-Baird, Reno, NV (US); Ryan William Cuddy, Reno, NV (US); Brian Daniel Swift, Sparks, NV (US); Anthony J. Baerlocher, Reno, NV (US); Cari L. Blomquist, Reno, NV (US); Lance R. Peterson, Reno, NV (US)

(73) Assignee: IGT, Reno, NV (US)

( * ) Notice: Subject to any disclaimer, the term of this patent is extended or adjusted under 35 U.S.C. 154(b) by 190 days.

This patent is subject to a terminal disclaimer.

(21) Appl. No.: 09/981,163

(22) Filed: Oct. 15, 2001

(65) Prior Publication Data

US 2002/0049084 A1 Apr. 25, 2002

Related U.S. Application Data

(63) Continuation-in-part of application No. 09/605,809, filed on Jun. 28, 2000, now Pat. No. 6,315,664.

(51) Int. Cl.[7] .................................................. A63F 13/00

(52) U.S. Cl. ............................................ 463/20; 463/25

(58) Field of Search ............................... 463/16–20, 25; 273/138.1, 138.2, 139

(56) References Cited

U.S. PATENT DOCUMENTS

| | | | | |
|---|---|---|---|---|
| 4,624,459 A | | 11/1986 | Kaufman | |
| 4,991,848 A | | 2/1991 | Greenwood et al. | |
| 5,116,055 A | | 5/1992 | Tracy | |
| 5,456,465 A | | 10/1995 | Durham | |
| 5,542,669 A | | 8/1996 | Charron et al. | |
| 5,711,525 A | | 1/1998 | Breeding | |
| 5,833,538 A | | 11/1998 | Weiss | |
| 5,873,781 A | | 2/1999 | Keane | |
| 6,089,976 A | | 7/2000 | Schneider et al. | |
| 6,102,798 A | | 8/2000 | Bennett | |
| 6,155,925 A | | 12/2000 | Giobbi et al. | |
| 6,159,097 A | | 12/2000 | Gura | |
| 6,159,098 A | | 12/2000 | Slomiany et al. | |
| 6,190,255 B1 | | 2/2001 | Thomas et al. | |
| 6,309,300 B1 | * | 10/2001 | Glavich | 463/26 |
| 6,592,457 B1 | * | 7/2003 | Frohm et al. | 463/16 |

FOREIGN PATENT DOCUMENTS

| | | |
|---|---|---|
| EP | 0 874 337 A1 | 10/1998 |
| EP | 0 945 837 A2 | 9/1999 |
| EP | 0 984 409 A2 | 3/2000 |

OTHER PUBLICATIONS

Welcome To Video Reality Brochure written by Altronic Casino Technology Ltd. published in 1995.

Jackpot Party Brochures and Articles written by WMS Gaming Inc. published in 1998, 2001.

High Low Card Game written by Qeocities.com (website) printed May 3, 2001.

Double Up Poker Game Description written by IGT published date unknown.

In Between Game Description written by IGT published date unknown.

* cited by examiner

*Primary Examiner*—John M. Hotaling, II
(74) *Attorney, Agent, or Firm*—Bell, Boyd & Lloyd, LLC

(57) ABSTRACT

The present invention relates to a bonus scheme for a gaming device which presents a plurality of selections to the player in one or more rounds. After a players chooses each selection, a processor, using predetermined probabilities, generates various outcomes. Depending upon which types of outcomes are generated, the player may advance to different rounds where the player can choose other selections, or instead the bonus round can terminate.

35 Claims, 6 Drawing Sheets

PRE-SELECTION
POST-SELECTION

ROUND ONE:

ROUND ONE:

ROUND TWO:

ROUND TWO:

ROUND THREE:

ROUND THREE:
AWARD
AWARD
PENALTY
20
40
5
100
30
200
200
50
10
(90%)
(65%)
(45%)
84a
84b
84c
84d
84e
84f
84g
84h
84i
86a
86b
86c
86d
86e
86f
86g
86h
86i
88a
88b
88c
88d
88e
88f
88g
88h
88i

GAMING DEVICE HAVING AN INDICATOR SELECTION WITH PROBABILITY-BASED OUTCOME

PRIORITY CLAIM

This application is a continuation-in-part application of U.S. patent application, Ser. No. 09/605,809, filed on Jun. 28, 2000 now U.S. Pat. No. 6,315,662, entitled "Gaming Device Having an Indicator Selection with Probability-Based Outcome."

CROSS-REFERENCE TO RELATED APPLICATIONS

This application is related to the following commonly-owned patent applications: "Gaming Device Having a Weighted Probability For Selecting A Bonus Game," Ser. No. 09/680,346, now U.S. Pat. No. 6,565,436 B1; "Gaming Device Having A Method For Randomly Generating A Bonus Round Outcome," Ser. No. 09/679,251, now U.S. Pat. No. 6,569,016 B1; "Gaming Device Having a Method For Randomly Generating A Bonus Round Outcome." Ser. No. 10/437,656; "Gaming Device With Bonus Scheme Having Multiple Award Levels," Ser. No. 09/602,140; "Gaming Device Having A Competition Bonus Scheme," Ser. No. 09/628,144, now U.S. Pat. No. 6,406,369 B1; "Gaming Device Having a Bonus Round With A Win, Lose Or Draw Outcome," Ser. No. 09/772,763, now U.S. Pat. No. 6,425, 824 B1; "Gaming Device Having a Bonus Round With A Win, Lose Or Draw Outcome," Ser. No. 10/163,805; "Gaming Device Having an Award Level Determination Competition." Ser. No. 10/241,325; "Gaming Device Having a Multi-Round Bonus Scheme Wherein Each Round Has a Probability of Success," Ser. No. 09/688,441; and "Gaming Device Having an Indicator Selection (with Probability-Based Outcome," Ser. No. 09/990,693, now U.S. Pat. No. 6,676,516.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a bonus scheme wherein players may choose one or more indicators which either award bonus values or terminate the bonus round based on a mathematical calculation using a predetermined probability.

BACKGROUND OF THE INVENTION

Gaming machines currently exist with bonus schemes in which the player has one or more opportunities to choose a particular selection or indicator from a group of indicators. An indicator may be any symbol or image such as a number, letter or graphical representation of a person, place or thing. When a player chooses an indicator, the game will either award the player with a bonus value or terminate the bonus round. The outcome depends upon the particular indicator selected by the player.

When the player selects an indicator which awards a bonus value (hereinafter referred to as "success indicator"), the player receives one or more bonus values, and the player has another chance to select another indicator. Each time the player selects a success indicator, the game typically displays a message for the player such as "NEXT." This message means that the bonus round continues and the player may choose another indicator. The player then selects another indicator, and this process continues until the player selects an indicator which terminates the bonus round (hereinafter referred to as "failure indicator").

When the player selects a failure indicator, typically the game displays a message for the player such as "COLLECT." This message means that the bonus round has terminated, and the player collects any bonus values the player accumulated.

Gaming machines with this type of bonus scheme are programmed so that in each bonus round certain indicators or a certain number of indicators are success indicators and certain indicators or a certain number of indicators are failure indicators. Consequently, the percentage of success indicators is predetermined and fixed. Therefore, when playing a bonus round, it is impossible for the player to select success indicators beyond the fixed percentage. Chance is only involved in the timing as to when the player chooses a failure indicator—before or after achieving the fixed percentage of success indicators. With this limited level of chance involved in the bonus round, players enjoy a minimal level of excitement and enjoyment. European Patent Application No. EP 0 945 837 A2 filed on Mar. 18, 1999 and assigned on its face to WMS Gaming, Inc. discloses a bonus scheme generally of this type.

SUMMARY OF THE INVENTION

The present invention overcomes the above shortcomings by providing a gaming device which has a bonus scheme wherein each of the indicators has a certain probability of being a success indicator or a failure indicator. Similar to flipping a coin where the predetermined probability of being heads or tails is fifty percent, in the present invention there is a predetermined probability of each indicator being a success indicator or a failure indicator. Upon or prior to the selection of the indicator, the computer in the gaming device determines, based on that probability, if the indicator is a success indicator or a failure indicator. Preferably all of the indicators have the same probability although the indicators may have different probabilities. Game developers may program the bonus round with desired probabilities for success indicators and failure indicators, depending on the payout desired and the level of excitement desired. Accordingly, in any bonus round, all of the indicators may be success indicators.

The gaming device of the present invention includes a game, preferably a slot machine, involving various combinations of indicia. The indicia are in the form of symbols often appearing on mechanical reels or simulated rotating reels (i.e., video reels). A player pushes a button or other activator and thereby randomly generates different indicia combinations. The game is programmed so that certain combinations will automatically initiate a bonus round.

When a player achieves such a combination, the bonus round begins. The bonus round gives a player the opportunity to gain credits beyond the credits the player has gained in the primary game. The bonus round also gives a player additional excitement and a reward for having played the game for a relatively long period of time.

The bonus round begins by providing the player with at least one and preferably a plurality of indicators. The game determines, based on the predetermined probability for each indicator whether each indicator is a success or a failure indicator. The player chooses an indicator. The computer processor of the gaming device, displays a success indicator or a failure indicator. If the processor displays a failure indicator, the bonus round terminates. If the processor displays a success indicator, the game awards the player the bonus value displayed with or corresponding to the success indicator. The bonus value numerals may themselves be the success indicator. The amount of the bonus value for each success indicator may vary. After the player achieves a success indicator, the player receives the appropriate bonus values, and the game gives the player another chance to choose another indicator.

This process continues until the gaming device displays a failure indicator or until the player has chosen all of the indicators in the bonus round. In either case the bonus round terminates. Alternatively, if the player chooses all of the indicators and they are all success indicators, the game may award the player with an achievement bonus value, the bonus round may automatically repeat or the game may provide a different bonus round. Upon termination of the bonus round, the game accumulates all of the bonus credits which the player has won and awards them to the player.

According to one embodiment of the present invention, the bonus scheme is placed in the context of a dodgeball game. The indicators are represented by a plurality of target characters. A separate character throws balls at the target characters or indicators. The player decides which target character will try to catch the ball. Each target character can catch the ball or be hit by the ball.

If the player chooses a target character who catches the ball (i.e., a failure indicator), the bonus round ends. If the player chooses a target character who is hit by the ball (i.e., a success indicator), the game awards the player with bonus values. The bonus round terminates when a target character catches a ball or after the ball hits all of the target characters in the bonus round.

In another embodiment, the gaming device provides the player with a plurality of indicators which function as selections. Also, the gaming device enables the player to advance to multiple rounds, wherein the player can choose additional selections. Preferably, each selection is associated with a predetermined probability of success and failure and with a bonus value. It is preferable that if a player reaches a success selection or outcome in a particular round, the gaming device reveals the values associated with all of the selections in that bonus round. Then the gaming device advances the player to another round where the player can choose another selection. The process preferably continues until the player reaches a failure selection or outcome, or until the player advances to all of the rounds, whichever comes first.

It is therefore an object of the present invention to provide a gaming device having a bonus scheme with indicators or selections having a predetermined probability-based outcome.

Another object of the present invention to provide a gaming device having a bonus scheme wherein the percentage of success indicators or success outcomes is not predetermined and fixed.

Yet another object of the present invention is to provide a gaming device having a bonus scheme which provides players with an increased level of excitement arising from chance.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
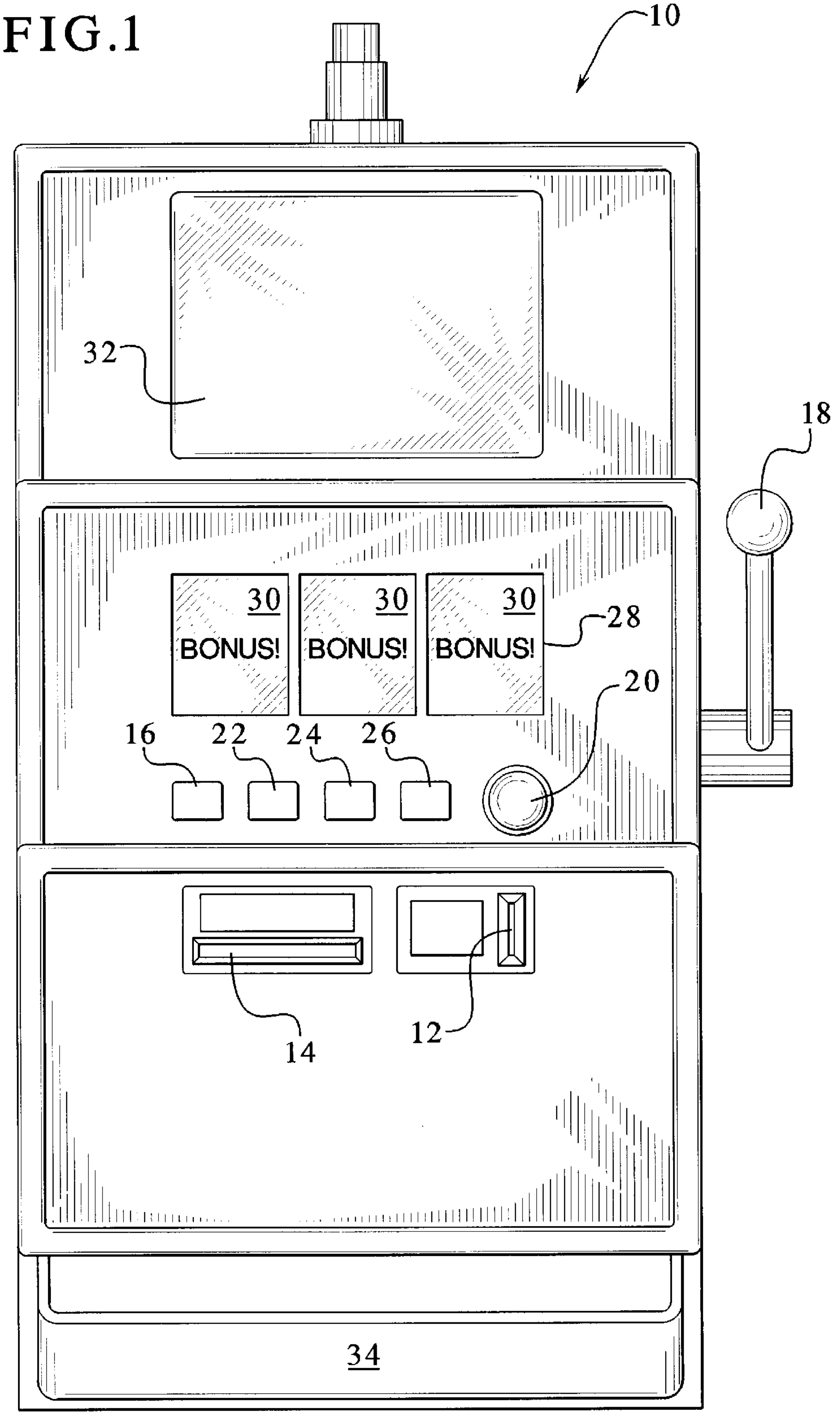
FIG. 1 is a front plan view one embodiment of the gaming device present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing. However, it should be appreciated that gaming device 10 can be constructed as a pub-style table-top game (not shown) which a player can operate while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any game such as slot, poker or keno in addition to any of their bonus triggering events which trigger the bonus scheme of the present invention. The symbols and indicia used on and in gaming device 10 may be in mechanical, electrical or video form.

As illustrated in FIG. 1, gaming device 10 includes a coin slot 12 and bill acceptor 14 where the player inserts money. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18, pushing play button 20 or activating any other mechanism which starts the game.

As shown in FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a display window 28 which contains a plurality of reels 30, preferably three to five reels in mechanical or video form. Each reel 30 displays a plurality of indicia such as bells, hearts, fruits, numbers, letters, bars or other images which preferably correspond to a theme associated with the gaming device 10. If the reels 30 are in video form, the gaming device 10 preferably displays the video reels 30 at video monitor 32 instead of at display window 28.

A player may "cash out" and thereby receive a number of coins corresponding to the number of remaining credits by pushing a cash out button 26. When the player "cashes out," the player receives the coins in a coin payout tray 34. The gaming device 10 may employ other payout mechanisms such as credit slips redeemable by a cashier or electronically recordable cards which keep track of the player's credits.

Figure 2:
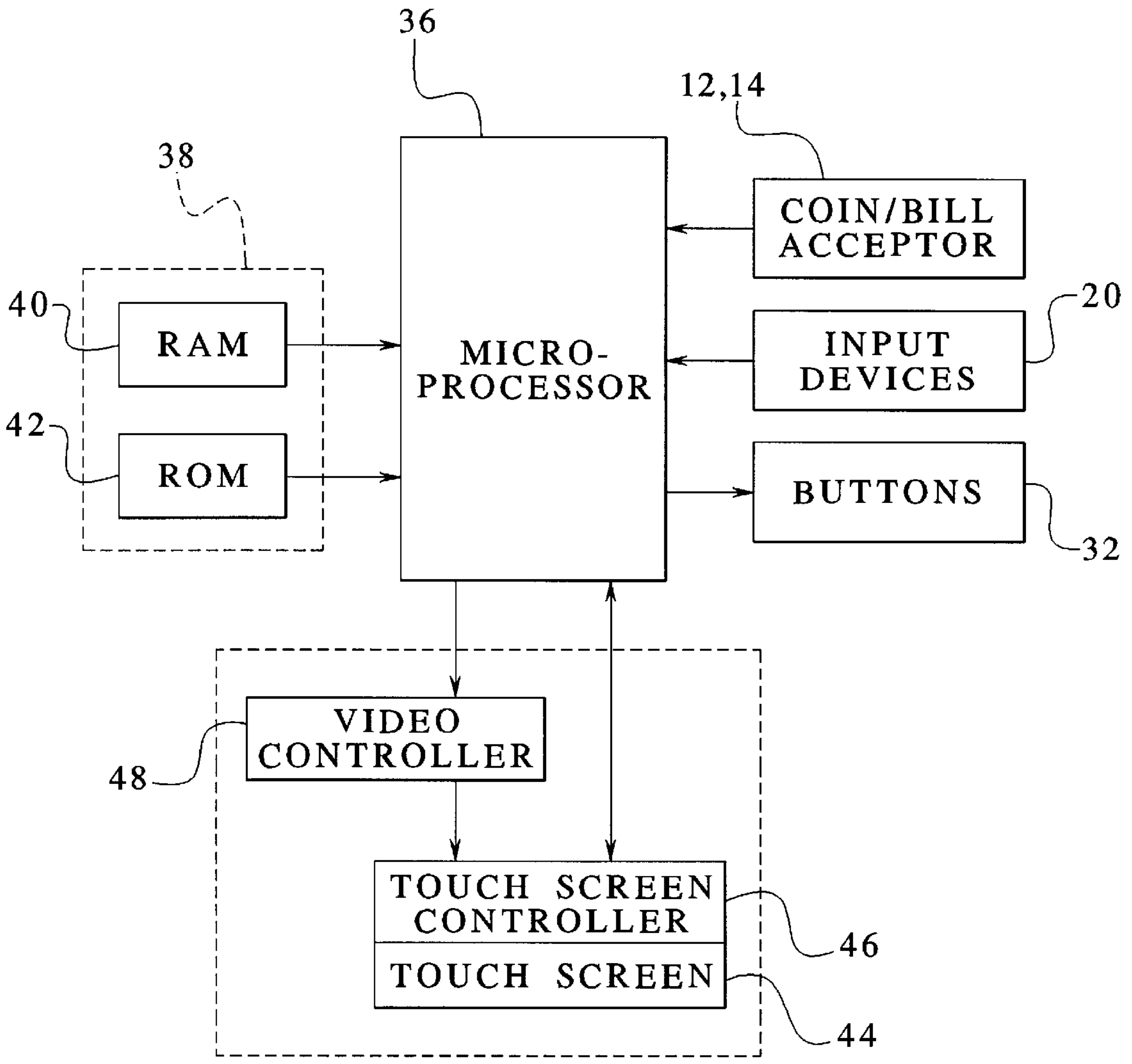
FIG. 2 is a schematic block diagram of the electronic configuration of one embodiment of the gaming device of the present invention.

With respect to electronics, gaming device 10 preferably includes the electronic configuration generally illustrated in FIG. 2, including a processor 36, a data storage device or memory device 38 for storing program code or other data, a video monitor 32 or other display device (i.e., a liquid crystal display) and at least one input device such as play buttons 20. The data storage device can include a hard drive, computer disk or any other suitable data storage medium. The processor 36 is preferably a microprocessor or microcontroller-based platform which is capable of displaying images, symbols and other indicia such as images of people, characters, places, things and faces of cards. The memory device 38 can include random access memory (RAM) 40 for storing event data or other data generated or used during a particular game. The memory device 38 can also include read only memory (ROM) 42 for storing program code which controls the gaming device 10 so that it plays a particular game in accordance with applicable game rules and pay tables.

As illustrated in FIG. 2, in terms of input preferably the player uses play buttons 20 to input signals into gaming device 10. Furthermore, it is preferable that touch screen 44 and an associated touch screen controller 46 are used instead of a conventional video monitor 32, Touch screen 44 and touch screen controller 46 are connected to a video controller 48 and processor 36. A player can make decisions and input signals into the gaming device 10 by touching touch screen 44 at the appropriate places. As further illustrated in FIG. 2, the processor 36 can be connected to coin slot 12 or bill acceptor 14. The processor 36 can be programmed to require a player to deposit a certain amount of money in order to start the game.

It should be appreciated that although a processor 36 and memory device 38 are preferable implementations of the present invention, the present invention can also be implemented using one or more application-specific integrated circuits (ASICs) or other hard-wired devices, or using mechanical devices. Furthermore, although the processor 36 and memory device 38 preferably reside on each gaming device 10 unit, it is possible to provide some or all of their functions at a central location such as a network server for communication to a playing station such as over a local area network (LAN), wide area network (WAN), Internet connection, microwave link, and the like. The processor 36 and memory device 38 are generally referred to herein as the "computer" or "controller."

With reference to FIGS. 1 and 2, to operate the gaming device 10, the player must insert the appropriate amount of money at coin slot 12 or bill acceptor 14 and then pull the arm 18 or push the play button 20. The reels 30 will then begin to spin. Eventually, the reels 30 will come to a stop. As long as the player has credits remaining, the player can spin the reels 30 again. Depending upon where the reels 30 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on the display window 28. The gaming device also includes a display device such as a video monitor 32 shown in FIG. 1 enabling the player to play the bonus round. Preferably, the qualifying condition is a predetermined combination of indicia appearing on a plurality of reels 30. As illustrated in the three reel slot game shown in FIG. 1, the qualifying condition could be the text "BONUS!" appearing in the same location on three adjacent reels.

Bonus Scheme

If a player achieves a bonus triggering or qualifying condition while playing the game, the gaming device 10 automatically begins the bonus round or bonus game of the present invention. As indicated by block 50 in FIG. 3, the bonus round or bonus game of the present invention begins by providing a player with a plurality of indicators on a display device 32 (FIG. 1). The indicators can display varying graphics and be of varying sizes, shapes and colors. The indicators are shown in FIG. 4 as squares in a grid, however, it should be appreciated that indicators can be separated and spread apart in an orderly or disorderly fashion.

Figure 3:
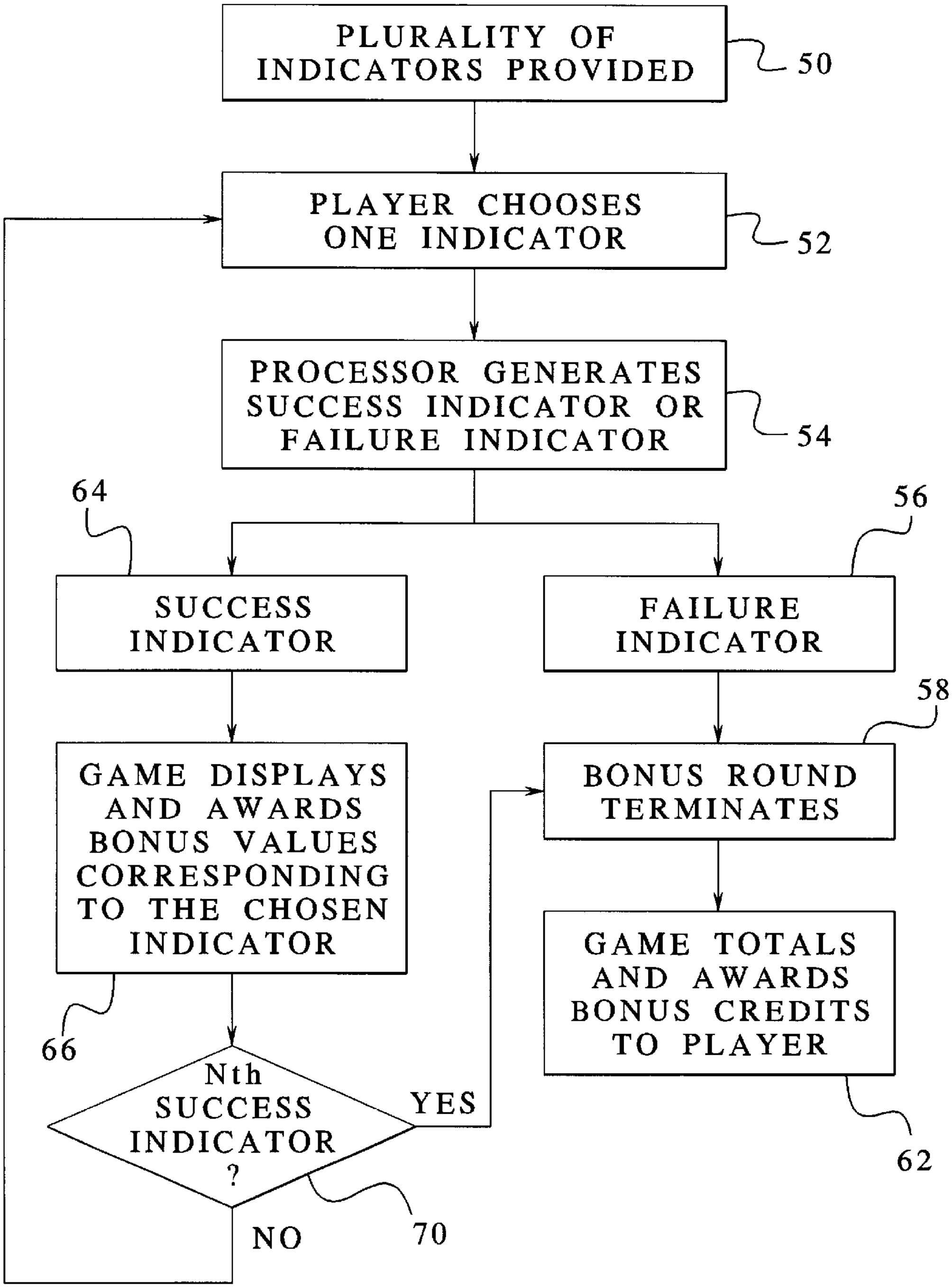
FIG. 3 is a flow diagram of one embodiment of the bonus scheme of the present invention.
Figure 4:
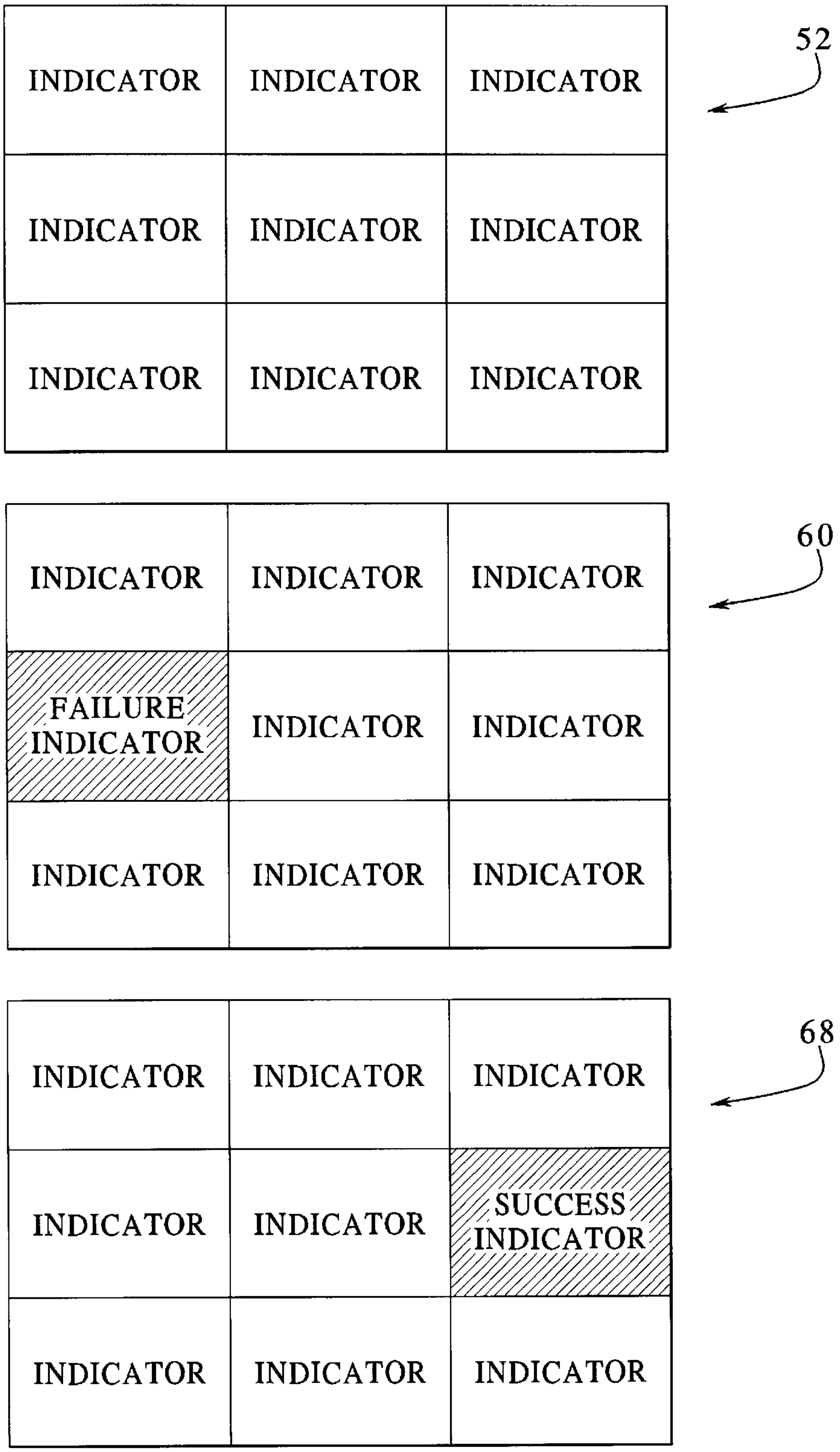
FIG. 4 is a top plan view of the indicators in one embodiment of the bonus scheme of the present invention.

After reviewing the plurality of indicators, the player chooses one indicator by touching the screen 32 displaying the indicator as indicated by block 52 in FIG. 3. Each time a player chooses an indicator, the processor 36 will generate either a success indicator or a failure indicator. When the player chooses an indicator, or preferably prior to displaying all the indicators to the player, the processor carries out one or more mathematical calculations based on predetermined probabilities for each indicator and determines if the indicator will be a success indicator or a failure indicator as indicated by block 54. Preferably, for all of the indicators for a particular bonus scheme, the processor 36 uses the same probability of being a success indicator. In one preferred embodiment, eighty-seven percent of the time, the processor 36 will generate a success indicator, and thirteen percent of the time, the processor 36 will generate a failure indicator. Other embodiments of the present invention can use different probabilities which may or may not vary for each indicator.

As shown in FIG. 3, if processor 36 generates or displays a failure indicator as indicated by block 56, the bonus round or bonus game terminates as indicated by block 58. A failure indicator is generally illustrated in grid 60 in FIG. 4 (i.e., the player selected the indicator in the first column and second row which resulted in a failure indicator.)

Upon termination, the game accumulates any bonus values and awards them to the player as indicated by block 62. If processor 36 generates or displays a success indicator, the game awards the player with bonus values corresponding to the chosen indicator, as indicated by blocks 64 and 66. Preferably, the game displays this bonus value on the video monitor 22. A success indicator is illustrated in grid 68 in FIG. 4 (i.e., the player selected the indicator in the third column and second row which resulted in a success indicator.) The success indicator may be a value of number of credits or symbol which represents a number of credits.

The processor 36 also determines how many success indicators the player has achieved, as indicated by diamond 70. In this embodiment, the maximum amount of success indicators any player can achieve is equal to the total number of indicators in any particular bonus round. For instance, if a bonus round has ten indicators, a player could achieve no more than ten success indicators.

If the amount of success indicators a player achieves is less than the total amount of indicators provided in the bonus round, the player may select another indicator. This process continues until the processor 36 generates or displays a failure indicator or until the player has achieved the maximum amount of success indicators. In either case, preferably the bonus round terminates as indicated by block 58, and the gaming device 10 awards credits to the player as indicated by block 62. It should be appreciated that the bonus scheme of the present invention could be designed so that if a player achieves the maximum amount of success indicators, the game awards the player with an achievement bonus value and/or the bonus round is automatically renewed. The achievement bonus value can be any amount and determined in any manner. Preferably, the achievement bonus value is a predetermined value.

Furthermore, if processor 36 generates success indicators and failure indicators before the player chooses an indicator, the bonus scheme can include a reveal screen. The bonus scheme of the present invention can be designed so that when a choice results in a failure indicator, video monitor 32 shown in FIG. 1 graphically reveals the location of the success indicators and failure indicators. This reveal screen can increase the excitement experienced by a player because the player will know which indicators would have been successful.

Since the bonus scheme of the present invention utilizes a probability-based mathematical calculation, a player may reach a failure indicator early in the bonus round (i.e., within the player's first few choices). At some point after playing several bonus rounds, players can become frustrated if, within their first few choices, they repeatedly reach a failure indicator. It should be appreciated that certain techniques can be used to minimize this type of frustration.

One technique requires processor 36 to perform its probability-based calculation before the player chooses an indicator. Processor 36 can discard its mathematical results and generate new results whenever a relatively high or predetermined percentage of failure indicators have been generated. This technique and others may be used to increase the likelihood that a player will achieve at least a minimal level of success and increase player excitement and enjoyment.

This bonus scheme of the present invention provides players with an element of chance not offered in existing bonus schemes. The game provides players with an opportunity to choose from a group of indicators. The outcome could be a success indicator or a failure indicator. The outcome is not fixed, limiting a player's chance of success. Instead, the outcome varies, depending upon a mathematical probability calculation. A player could thus choose all of the indicators, all resulting in success indicators. At the same time, upon a player's first choice, the outcome could be a failure indicator, ending the bonus round. An additional bonus value could be awarded if the player obtains all success indicators in the bonus round. Alternatively, in such case, the bonus round may be repeated.

Figure 5:
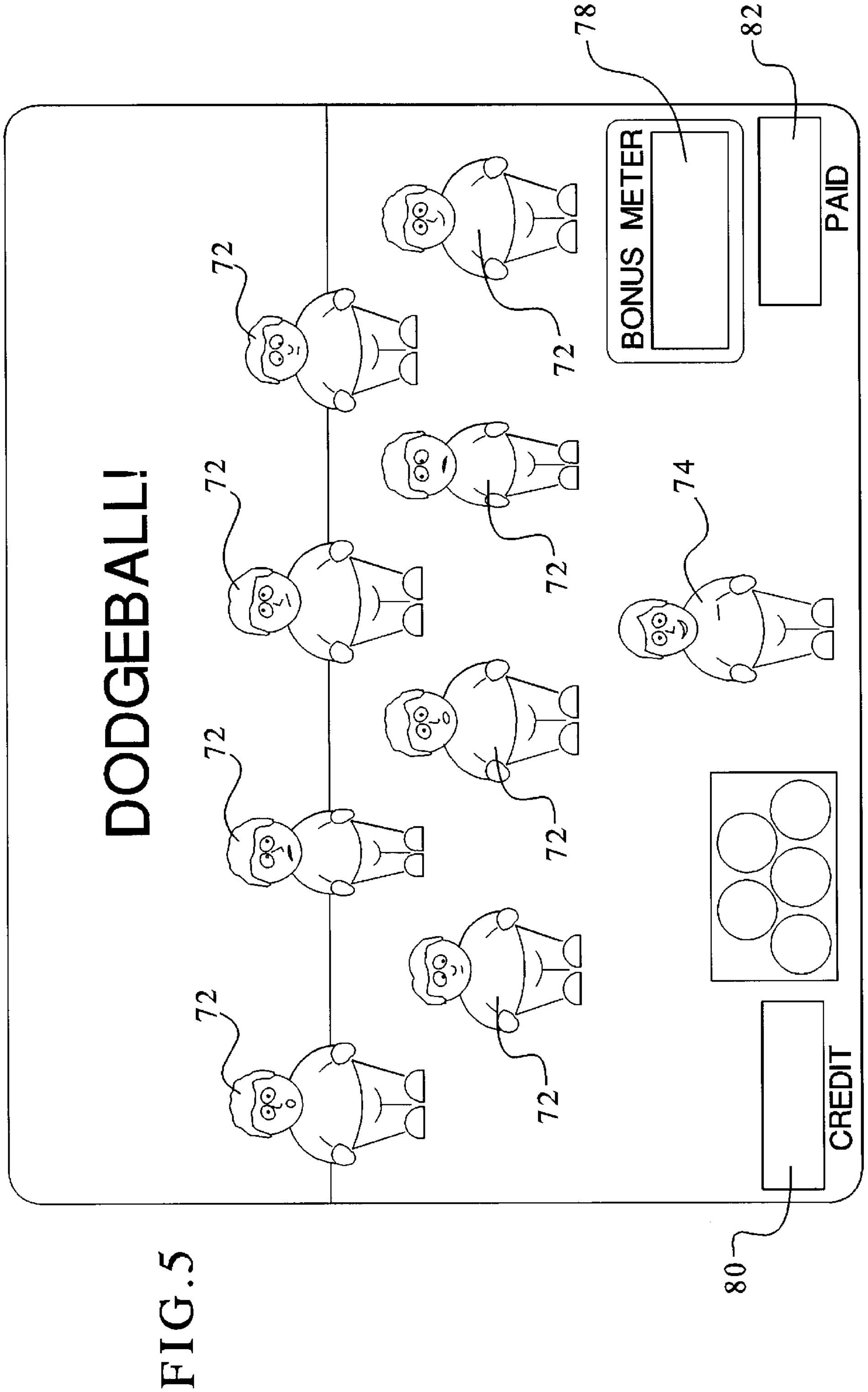
FIG. 5 is a top plan view of an alternative embodiment of the indicators of the bonus scheme of the present invention.
Figures 6A, 6B, 7A, 7B, 8A, 8B:
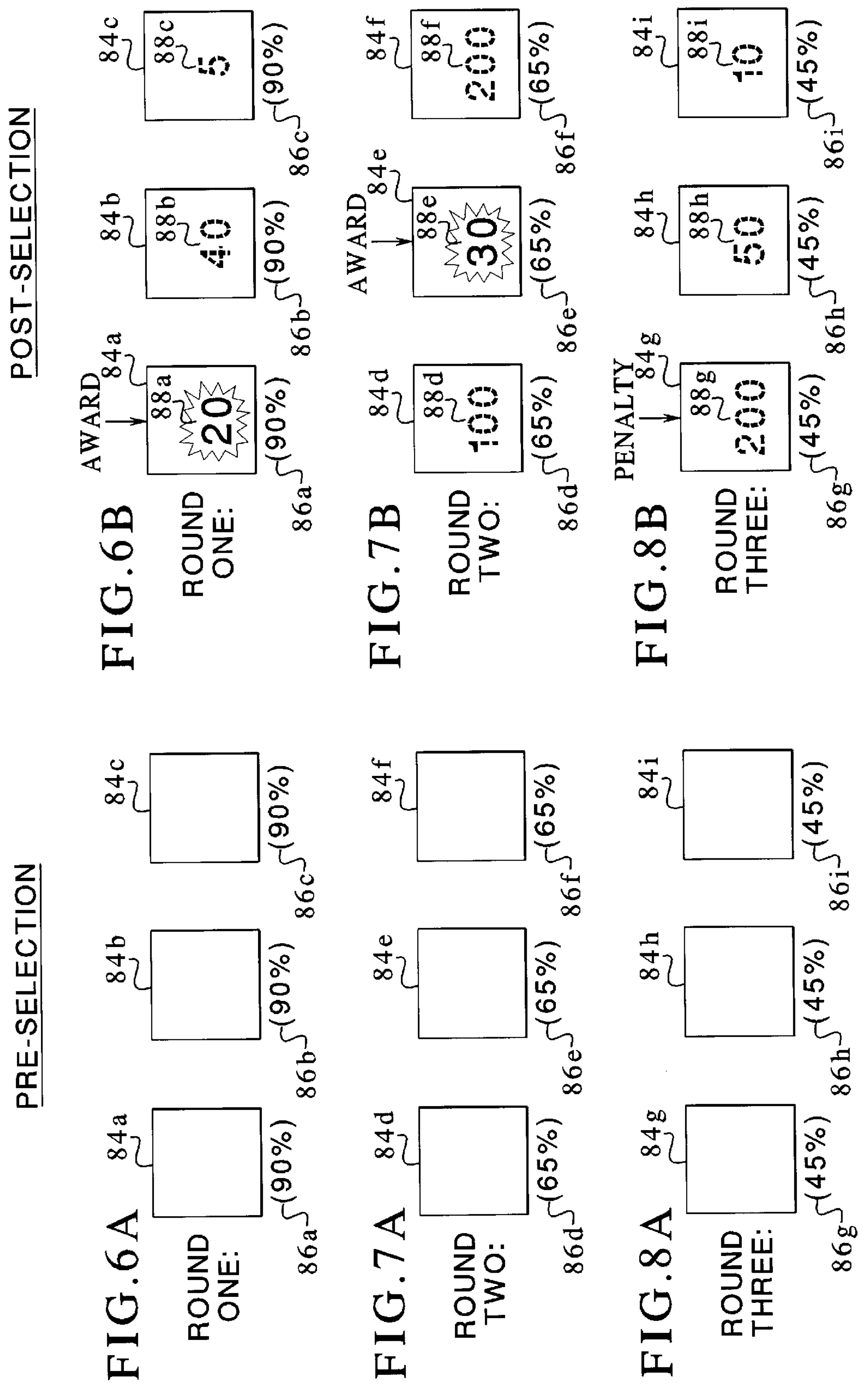
FIGS. 6A through 6B are top plan views of a first round in an example bonus round in one embodiment of the present invention.
FIGS. 7A through 7B are top plan views of a second round in an example bonus round in one embodiment of the present invention.
FIGS. 8A through 8B are top plan views of a third round in an example bonus round in one embodiment of the present invention.

In one preferred embodiment of the present invention shown in FIG. 5, the bonus scheme is implemented through target characters 72 participating in a dodgeball game. The target characters 72 are the indicators. Another character 74 throws a ball at a target character 72 selected by the player. The player chooses a target character 72 by touching touch screen 44 at the location of the image of the target character 72. After the player touches touch screen 44, the character 74 automatically retrieves a ball and throws it at the selected target character 72.

Prior to displaying the target characters 72 or when a player chooses a target character 72, the processor 36 performs mathematical calculations based on the predetermined probability for each indicator. The processor 36 generates or displays a success indicator or failure indicator for the chosen target character 72. If the processor 36 generates or displays a success indicator, the ball hits the target character 72 and bounces off the target character 72. The target character 72 is knocked over or off balance, and a bonus credit appears near the target character 72. In addition bonus meter 78, which displays a running total of all bonus values will display the bonus values which the player gained.

If the processor 36 generates or displays a failure indicator, the target character 72 catches the ball and the bonus round terminates. In addition, if the player achieves a number of success indicators equal to the total number of target characters 70, the bonus round automatically terminates. In either case, once the bonus round terminates, the game accumulates and awards any bonus credits which the player gained. The game displays the credit points which the player gained at credit meter 80. The game displays the amount of money the player has won in the paid window 82 illustrated in FIG. 5.

As shown in FIG. 5, the scenery for this preferred embodiment is a gymnasium setting including one or more phrases such as "Dodgeball!" In addition, the preferred embodiment can include audio features (i.e., songs, voices, and other sound effects) which are consistent with the dodgeball theme of this preferred embodiment.

In an alternative embodiment shown in FIGS. 6A through 8B, the gaming device provides a player with a bonus game in which the player can choose a plurality of selectable indicators in a plurality of different rounds. The selectable indicators function as selections. Each selectable indicator is associated with a predetermined award and a predetermined penalty. An award includes any event or sequence of events which involves value being designated for or provided to a player; a round change in a bonus game; a new or renewed bonus game; or any increase in a player's success. A penalty includes any event or sequence of events which involves value being removed from a player; a round change in a bonus game; the termination of a bonus game; or any decrease in a player's success.

When a player chooses a selectable indicator, the player may receive an award or a penalty. Whether the player receives an award or a penalty depends upon the outcome of a probability-based calculation. The gaming device processor uses an independent probability associated with the chosen selectable indicator. The independent probability mathematically weighs the chances that a player will receive an award versus a penalty. This independent probability operates as a heads or tails or heads/tails probability. For example, if the award were heads and the penalty were tails, the independent heads/tails probability or award/penalty probability would be fifty percent award and fifty percent penalty. In one embodiment, each of the selectable indicators is associated with an independent probability which is numerically the same for all selectable indicators. In one embodiment, each award includes a bonus value.

In one embodiment illustrated in FIGS. 6A through 8B, the award associated with each of the selectable indicators is a bonus value and a round change, and the penalty associated with each of the selectable indicators is a termination event which results in the termination of the bonus game.

Here, in round one, the gaming device initially displays three selectable indicators 84*a*, 84*b* and 84*c*, which as indicated are associated with independent award probabilities 86*a*, 86*b* and 86*c*, respectively. The independent award probability associated with selectable indicator 84*a* is ninety percent. There is a ninety percent probability that the result will be an award and a ten percent probability that the result will be termination of the bonus game. In this example, the player initially chooses the selectable indicator 84*a*. As a result, the processor, taking into account the probability 86*a* associated with selection 84*a*, generates an award which includes bonus value 88*a* and a round change. The gaming device reveals or unmasks value 88*a* associated with selection 84*a*, and the gaming device also preferably displays or reveals the bonus values 88*b* and 88*c* associated with the other selections in that round. The gaming device then stores or designates value 88*a* for the player and advances the player to a second round.

In round two, the gaming device displays a different set of selectable indicators 84*d* through 84*f* to the player. The player here chooses the middle selection 84*e*. Again, taking into account the sixty-five percent independent award probability 86*e* associated with the selectable indicator 84*e*, the processor generates an award which includes bonus value 88*e* and a round change. The gaming device then displays or reveals the bonus values 88*d* through 88*f* associated with selectable indicators 84*d* through 84*f*. The gaming device stores or designates bonus value 88*e* for the player and then advances the player to a third round.

In the third round, the gaming device again displays a different set of selectable indicators 84*g* to 84*i* to the player. Here, the player chooses selectable indicator 84*g*. In this instance, the processor uses independent award probability 86*h* to generate a penalty, which is a termination of the bonus round. The gaming device then reveals the values 88*g* through 88*i* associated with each of the selectable indicators in that round.

Next, the gaming device awards the player with each bonus value gained by the player which, in this case, is fifty (the sum of twenty and thirty), and then the bonus game terminates. In this alternative embodiment, the gaming device enables the player to continue choosing selections or selectable indicators until the player reaches a termination outcome or until the player has advanced to a predetermined number of rounds, whichever comes first.

In one example of this embodiment, the selectable indicators or selections are graphical objects. When a player chooses a graphical object, the graphical object is directed in the direction of a plurality of other graphical objects. If the processor generates an award, the display device displays an indicator in the form of one graphical object hitting another graphical object. If, on the other hand, the processor generates a penalty, the display device displays an indicator in the form of a graphical object missing another graphical object.

A different example of this embodiment involves a sound recording which the gaming device plays when the bonus game begins. Each round includes a plurality of selections or selectable indicators which are graphically displayed as objects. If a player chooses an object which results in an award, the gaming device designates or stores a bonus value for the player. The sound recording then continues to play, the gaming device reveals the potential bonus value awards associated with all of the objects and the player advances to a different round. If the player then chooses an object which results in a penalty, the sound recording terminates and the gaming device reveals the potential bonus value awards associated with all of the objects. The gaming device then awards the player with the bonus value gained in the first round, and the bonus game terminates.

It should be appreciated that, in these embodiments with multiple rounds, it is preferable that the independent probabilities associated with each of the selections or selectable indicators are the same; however, the present invention can be adapted so that these independent probabilities vary from one selectable indicator to another. Furthermore, the present invention can be adapted so that the independent probabilities vary with respect to the various rounds. For example, the probability of penalty can gradually increase from round to round. In addition, the bonus values associated with each of the selectable indicators can gradually increase or decrease from round to round. In addition, it is preferable that when a player chooses a selectable indicator, in the upcoming round the gaming device does not enable the player to choose that selectable indicator again. However, the present invention can be adapted so that the player can choose the same selectable indicator on multiple occasions.

Furthermore, the present invention can be adapted so that the gaming device does not reveal the bonus values associated with all of the selectable indicators in any single round. In this case, the gaming device can maintain the same bonus values associated with the same selectable indicators from round to round. Preferably, the gaming device prevents the player from choosing the same selectable indicator more than once.

The embodiments discussed above which involve multiple rounds can involve any number of selectable indicators and any number of rounds. Furthermore, these embodiments can incorporate any type of theme for entertainment purposes, such as those involving object throwing, music playing or games or sports which are carried out in multiple rounds or sets, such as boxing. These types of embodiments which involve multiple rounds preferably enable gaming device players to choose selections or selectable indicators in multiple rounds until the player reaches a termination penalty which is generated based upon probabilities independently associated with each of the selectable indicators.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is hereby claimed as follows:

1. A gaming device having a game, comprising:

at least two rounds;

a plurality of selectable indicators in each of the rounds;

a plurality of independent award probabilities, wherein each independent award probability is individually associated with each of the selectable indicators;

a display device which displays the selectable indicators; and a processor in communication with said display device, which: (a) enables a player to select one of the selectable indicators in a first of said rounds; (b) independently determines if an award is associated with said selected indicator after said selected indicator is selected regardless of whether any other of the selectable indicators are associated with any awards and based on the independent award probability associated with said selected indicator; and (c) if an award is associated with the selected indicator, provides the player with the award and enables the player to select one of the selectable indicators in a second of said rounds.

2. The gaming device of claim 1, wherein the award includes a value.

3. The gaming device of claim 2, wherein an average of the values associated with the selectable indicators in each round are different.

4. The gaming device of claim 3, wherein the average of the values for the second round is higher than the average for the first round.

5. The gaming device of claim 1, wherein the game terminates if the processor determines that an award is not associated with said selected indicator based on the independent award probability associated with said selected indicator.

6. The gaming device of claim 1, wherein the independent award probability associated with each of the selectable indicators in at least one of the rounds is the same.

7. The gaming device of claim 1, wherein at least two of the independent award probabilities are different.

8. The gaming device of claim 1, wherein an average of the independent award probabilities associated with the selectable indicators in each round are different.

9. The gaming device of claim 8, wherein the average of the independent award probabilities for the second round is lower than the average of the independent award probabilities for the first round.

10. The gaming device of claim 8, wherein the average of the independent award probabilities for the first round is lower than the average of the independent award probabilities for the second round.

11. The gaming device of claim 1, wherein the award includes a round change in the game.

12. The gaming device of claim 1, wherein the award includes a new or renewed game.

13. A gaming device having a game, comprising:

at least two rounds;

a plurality of selectable indicators in each of the rounds;

a plurality of independent award probabilities, wherein each independent award probability is individually associated with each of the selectable indicators;

a display device which displays the selectable indicators; and a processor in communication with said display device, which: (a) enables a player to select one of the selectable indicators in a first of said rounds; (b) independently determines if an award is associated with each said selectable indicator before said selectable indicators are selected regardless of whether any other of the selectable indicators are associated with any awards and based on the independent award probabilities associated with each of said selectable indicators; and (c) if an award is associated with the selected indicator, provides the player with the award and enables the player to select one of the selectable indicators in a second of said rounds.

14. The gaming device of claim 13, wherein the game terminates if the processor determines that an award is not associated with said selected indicator based on the independent award probability associated with said selected indicator.

15. The gaming device of claim 13, wherein the independent award probability associated with each selectable indicator is the same.

16. The gaming device of claim 13, wherein at least two of the independent award probabilities are different.

17. The gaming device of claim 13, wherein an average of the independent award probabilities associated with the selectable indicators in each round are different.

18. The gaming device of claim 17, wherein the average of the independent award probabilities for the second round is lower than the average of the independent award probabilities for the first round.

19. The gaming device of claim 13, wherein an average of the values associated with the selectable indicators in each round are different.

20. The gaming device of claim 19, wherein the average of the values for the second round is higher than the average of the values for the first round.

21. The gaming device of claim 19, wherein the average of the values for the first round is higher than the average of the values for the second round.

22. The gaming device of claim 13, wherein the award includes a round change in the game.

23. The gaming device of claim 13, wherein the award includes a new or renewed game.

24. A gaming device having a game, comprising:

at least two rounds;

a plurality of player selectable indicators in each of the rounds;

a data storage device;

a plurality of independent probabilities stored in the data storage device, wherein each independent probability is individually associated with each of the selectable indicators;

a plurality of award values and termination events stored in the data storage device;

a display device for displaying said selectable indicators;

a selector for enabling a player to select said selectable indicators; and a processor in communication with said data storage device, selector and display device, which: (a) enables a player to select one of the selectable indicators in a first of said rounds; (b) performs a calculation based on the independent probability associated with said selected indicator regardless of whether any other of the selectable indicators are associated with any of the award values; (c) associates one of the award values or the termination event with the selected indicator based on said calculation; (d) if said selected indicator is associated with one of said award values, provides said award value to the player and enables the player to select one of the selectable indicators in a second of said rounds; and (e) terminates the game if said selected indicator is associated with said termination event.

25. The gaming device of claim 24, wherein the processor performs the calculation before the player selects each said selected indicator.

26. The gaming device of claim 24, wherein the processor performs the calculation after the player selects one of the selectable indicators.

27. A gaming device having a game, comprising:

at least two rounds;

a plurality of player selectable indicators in each of the rounds;

a data storage device;

a plurality of independent probabilities stored in the data storage device, wherein each independent probability is individually associated with each of the selectable indicators;

a plurality of award values, round change events and termination events stored in the data storage device;

a display device for displaying said selectable indicators;

a selector for enabling a player to select said selectable indicators; and a processor in communication with said display device, data storage device and selector, which: (a) enables a player to select one of the selectable indicators in a first of said rounds; (b) independently performs a calculation based on the independent probability associated with said selected indicator regardless of whether any other of the selectable indicators are associated with any of the award values, said probability calculation resulting in one of the award values, round change event or termination event; (c) if the result is an award value, provides the award value to the player; (d) if the result is said round change event, enables the player to select one of the selectable indicators in a second of said rounds; and (e) if the result is said termination event, terminates the game.

28. The gaming device of claim 27, wherein the processor performs the calculation before the player selects each selected indicator.

29. The gaming device of claim 27, wherein the processor performs the probability calculation after the player selects one of the selectable indicators.

30. A gaming device having a game comprising:

a processor;

a display device controlled by the processor;

a memory device accessible by the processor; and a plurality of instructions stored in the memory device for causing the processor to:

(a) cause the display device to display a plurality of graphical images to a player in a first round;

(b) enable the player to select at least one of the graphical images;

(c) determine any award based on an independent award probability associated with the selected graphical image regardless of whether any other of the graphical images are associated with any awards;

(d) provide the player with said award, if any, associated with the selected graphical image;

(e) display a new plurality of graphical images to the player in a second round if the processor provides the player with an award associated with the selected graphical image; and repeat steps (a) through (e) at least once.

31. A method for operating a gaming device, said method comprising the steps of:

(a) displaying a plurality of selectable indicators, wherein each selectable indicator is player selectable;

(b) enabling a player to select one of said selectable indicators;

(c) independently determining if an award is associated with the selected indicator based on an independent award probability associated with said selected indicator regardless of whether any other of the selectable indicators are associated with any awards;

(d) if an award is associated with said selected indicator, displaying the award;

repeating steps (a) to (d) until an award is not associated with one of the selected indicators; and providing the player with said displayed awards.

32. The method of claim 31, which includes determining if a number of awards are associated with the selected indicators prior to ending the game and repeating steps (a) to (d) until a predetermined number of the awards are associated with the selected indicators.

33. The method of claim 31, which includes determining if a total value of the awards is associated with the selected indicators prior to ending the game and repeating steps (a) to (d) if the total value of said awards is less than a predetermined value.

34. The method of claim 31, which includes awarding the player an achievement award if awards are associated with all of the selected indicators.

35. The method of claim 31, which includes repeating steps (a) to (d) before ending the game if awards are associated with all of the selected indicators.

* * * * *